(12) United States Patent
Kloft et al.

(10) Patent No.: US 11,092,288 B2
(45) Date of Patent: Aug. 17, 2021

(54) METHOD FOR PRODUCING PRESSURE VESSELS

(71) Applicant: HYDAC TECHNOLOGY GMBH, Sulzbach/Saar (DE)

(72) Inventors: Peter Kloft, Ransbach-Baumbach (DE); Herbert Baltes, Losheim (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 197 days.

(21) Appl. No.: 16/065,842

(22) PCT Filed: Dec. 29, 2016

(86) PCT No.: PCT/EP2016/002187
§ 371 (c)(1),
(2) Date: Jun. 25, 2018

(87) PCT Pub. No.: WO2017/114595
PCT Pub. Date: Jul. 6, 2017

(65) Prior Publication Data
US 2019/0017655 A1    Jan. 17, 2019

(30) Foreign Application Priority Data

Dec. 31, 2015 (DE) ..................... 10 2015 017 026.0

(51) Int. Cl.
*F17C 1/16* (2006.01)
*B22F 5/10* (2006.01)
(Continued)

(52) U.S. Cl.
CPC .................. *F17C 1/16* (2013.01); *B22F 5/10* (2013.01); *B22F 10/20* (2021.01);
(Continued)

(58) Field of Classification Search
CPC .. B22F 3/1055; B22F 5/10; B22F 2003/1057; B23K 15/0086; B33Y 10/00;
(Continued)

(56) References Cited

U.S. PATENT DOCUMENTS

2003/0004600 A1* 1/2003 Priedeman, Jr. ........ C08L 81/06
700/119
2015/0267812 A1 9/2015 Hinton et al.
(Continued)

FOREIGN PATENT DOCUMENTS

DE           31 11 410        10/1982
DE   10 2007 003 723          7/2008
(Continued)

OTHER PUBLICATIONS

English Equivalentof WO 2013160198 A1 (Year: 2013).*
International Search Report (ISR) dated May 10, 2017 in International (PCT) Application No. PCT/EP2016/002187.

*Primary Examiner* — Christopher J Besler
*Assistant Examiner* — Christine Bersabal
(74) *Attorney, Agent, or Firm* — Wenderoth, Lind & Ponack, L.L.P.

(57) ABSTRACT

A method for producing pressure vessels, including pressure accumulators, such as hydraulic accumulators and parts of the parts of the accumulator (24). The parts produced by a 3D printing method can include one or more or all of two housing parts and a separating element separating the interior chamber of the two hosing parts are at least partially produced by a 3D printing method.

10 Claims, 4 Drawing Sheets

(51) Int. Cl.
*F17C 1/00* (2006.01)
*F15B 1/10* (2006.01)
*B33Y 80/00* (2015.01)
*F17C 1/14* (2006.01)
*B22F 10/20* (2021.01)
*B33Y 10/00* (2015.01)
*B23K 15/00* (2006.01)
*B22F 10/30* (2021.01)

(52) U.S. Cl.
CPC .......... *B23K 15/0086* (2013.01); *B33Y 10/00* (2014.12); *B33Y 80/00* (2014.12); *F15B 1/106* (2013.01); *F17C 1/00* (2013.01); *F17C 1/14* (2013.01); *B22F 10/30* (2021.01); *F15B 2201/405* (2013.01); *F15B 2201/4056* (2013.01); *F15B 2201/605* (2013.01); *F17C 2203/066* (2013.01); *F17C 2203/0636* (2013.01); *F17C 2209/00* (2013.01); *F17C 2209/2109* (2013.01); *F17C 2270/0554* (2013.01); *Y02P 10/25* (2015.11)

(58) Field of Classification Search
CPC .... B33Y 80/00; F15B 1/106; F15B 2201/405; F15B 2201/4056; F15B 2201/605; F17C 1/00; F17C 1/14; F17C 1/16; F17C 2203/066; F17C 2203/0636; F17C 2209/00; F17C 2209/2109; F17C 2270/0554; Y02P 10/295
See application file for complete search history.

(56) References Cited

U.S. PATENT DOCUMENTS

| 2015/0375340 | A1* | 12/2015 | Cui | B29C 64/153 428/188 |
| 2016/0061381 | A1* | 3/2016 | Kotliar | B23K 15/0086 138/39 |
| 2016/0238193 | A1 | 8/2016 | Meyer | |

FOREIGN PATENT DOCUMENTS

| DE | 10 2014 008 649 | | 12/2015 | |
| DE | 102014010006 | A1 * | 1/2016 | ................ F15B 1/24 |
| EP | 3 056 792 | | 8/2016 | |
| WO | WO-2013160198 | A1 * | 10/2013 | ............ B32B 18/00 |
| WO | 2015/008669 | | 1/2015 | |
| WO | 2015/142862 | | 9/2015 | |
| WO | 2016/120571 | | 8/2016 | |
| WO | 2016/138996 | | 9/2016 | |

* cited by examiner

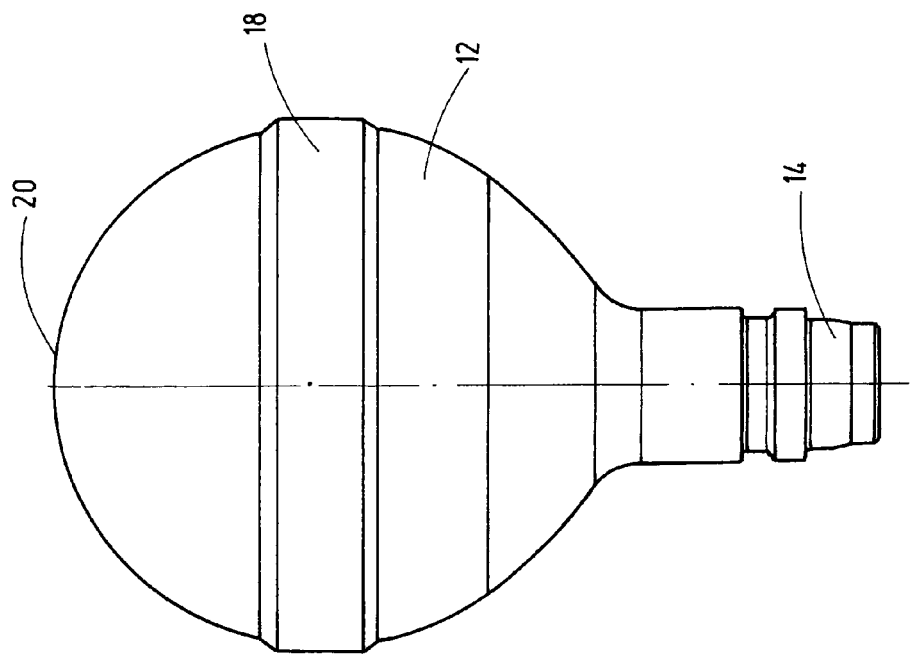
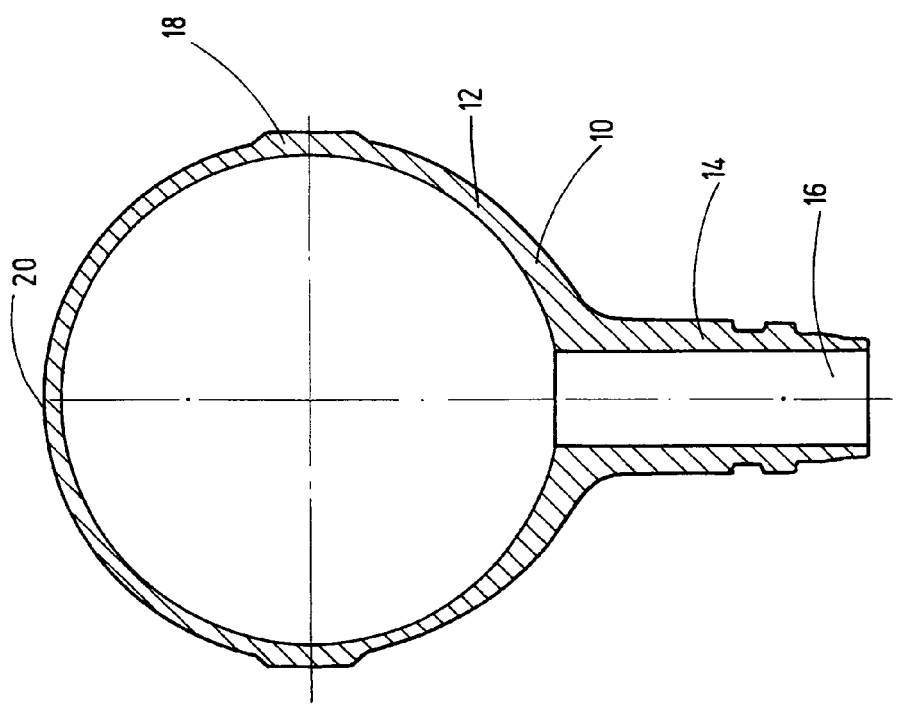

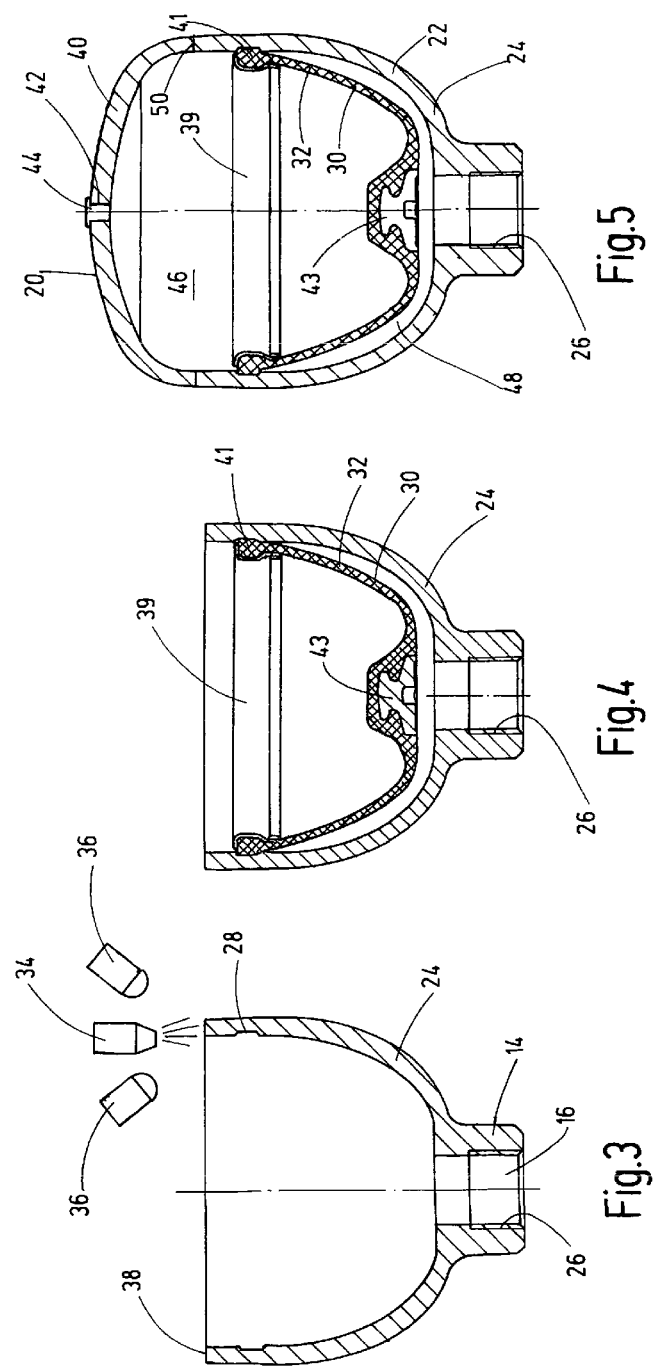

METHOD FOR PRODUCING PRESSURE VESSELS

FIELD OF THE INVENTION

The invention relates to a method for producing pressure vessels, including pressure accumulators, such as hydraulic accumulators and parts thereof.

BACKGROUND OF THE INVENTION

Pressure vessels are by common consensus understood to be closed vessels. The pressure on the inside of the pressure vessels is greater than the ambient pressure. Pressure vessels commonly include storage vessels for gases and compressed air vessels and silos with compressed air application as well as pressure accumulator vessels such as hydraulic accumulators, membrane extension vessels, air chambers, etc. According to the European legislation on free movement of goods, there is considered to be a difference between simple pressure vessels according to directive 2009/105/EC and pressure devices according to the pressure devices directive 97/23/EC.

Hydraulic accumulators, which are also referred to as hydro accumulators in technical parlance, essentially serve to store pressure energy. In the case of the weight-loaded and spring-loaded, mechanical hydraulic accumulators, this storage occurs by a change of potential energy, whereas the gas-loaded accumulators change the internal energy of a working gas. Depending on the design of their separating element with which different fluids can be separated from one another inside the accumulator housing, there is differentiation between membrane accumulators, piston accumulators, bladder accumulators and bellows accumulators. The operation of these accumulators is essentially based on utilizing the compressibility of a gas for fluid accumulation. Nitrogen is commonly used as the energy medium. If the hydraulic accumulator has no separating element, it is usually a known air chamber construction.

The above described pressure vessels and their separating elements can be produced in numerous ways. In addition to a machining forming for the accumulator housing, it can also be obtained by casting. Increasingly, pressure vessels produced with a composite construction are also used in order to then obtain with low material input costs, a low construction weight and high structural strength for the accumulator. DE 10 2014 008 649 A1 discloses a method for producing such a pressure vessel, preferably in the form of a bladder accumulator, in which firstly a supporting structure, in particular in the form of a liner, is provided, onto which a fiber material is applied with formation of a basic structure. The basic structure, in turn introduced into a heatable molding device, permits the introduction of a matrix between the molding device and the basic structure. The matrix at least partially penetrates the fiber material and is appropriately hardened after demolding to produce the accumulator housing of a bladder accumulator.

This in principle very advantageous method, which results in accumulator housings with high compressive strength with a particularly low construction weight, is disadvantageous in that for each accumulator type a separate molding device must be created, which to this extent increases the production costs considerably. The hardening of the matrix in the heatable mold also requires, in addition to the energy costs for the mold heating, production time, despite the relatively short reaction times of a reactive resin system for the matrix. In addition, the handling costs for handling the molding device should not be underestimated.

SUMMARY OF THE INVENTION

Given this prior art, the problem addressed by the invention is to provide an improved method to produce accumulator housings with high compressive strength with reduced handling costs and with reduced molding costs.

This problem is basically solved by a method according to the invention where the pressure vessels and potentially the parts thereof are at least partially produced by a 3D printing method. A molding device, such as a molding tool to be heated, can then be dispensed with entirely. Instead, an accumulator housing of a pressure vessel or parts of such pressure vessels, such as separating elements, can be produced in a molding tool free manner, which also significantly reduces the manual or labor costs during production. The technical term pressure vessel should be understood in a very broad sense and includes for example liner constructions, which are then preferably strengthened with fiber fabrics (composites).

The 3D printing method according to the invention makes it possible to realize nearly all forms of pressure vessels and pressure accumulators and specifically in a free forming manner. A multitude of design options can be realized, with an accumulator housing then being able to be adapted in a relatively free manner even to special installation situations in situ, so that it is not always necessary to have recourse to symmetrical accumulator housings of pressure vessels. In particular in the context of the realization of membrane accumulators, a large number of new design forms can be produced, which can be adapted to the installation space in situ. Above all, it is possible to realize with only one 3D printing production device a large number of different pressure vessels, which can also differ in terms of accumulator size. With only one production device, it is then possible to print a number of accumulators. There is no equivalent of this method in the prior art of pressure vessels. Pressure-stable accumulator devices having any design whatsoever may be obtained with 3D printing methods with low production costs and adhering to relatively short production times.

In addition to the actual accumulator housing, the 3D printing method also allows production of additional components of a pressure vessel, in particular in the form of separating elements, such as accumulator bladders, separating membranes or accumulator pistons. In addition, the connection points on the pressure vessel housings can be designed at the same time or designed as separate installation parts. Particularly preferably envisaged is producing a part of the pressure vessel housing by the 3D printing method, then to introduce the separating element and subsequently to finish printing the accumulator housing by the 3D printing.

Because 3D production printing machines are becoming increasingly cheaper and take up little space and, with appropriate software equipment, allow even ordinary people to produce print products, relocating the vessel production to the production site of the customer who requires such pressure vessels, such as pressure accumulators, in the customer's production is conceivable. In this way the pressure vessels could then be integrated "just in time" into the main production of the customer who requires such accumulator products for his product creation.

By contrast with the above described production method, producing only parts of the respective pressure vessel by a 3D printing method and connecting the produced product to conventionally produced pressure vessel parts is also possible. Thus, for example, a shell-shaped housing part of a membrane accumulator could be obtained by a 3D printing method and the additional shell-shaped housing part, which is required for the completion of the accumulator housing as a whole could be obtained by a conventional production method, for example in a machining manner or by a casting method. The connection of the two housing parts to one another can then take place by a conventional welding method or using special, in particular thermally stable adhesives, which are commercially available today.

Because a 3D printing method allows the processing not only of plastics but also of metal materials, both materials can be used for the creation of the pressure vessel, so that again in a broader sense accumulator realizations can be realized according to customer requirements.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure and that are schematic and not to scale:

FIGS. 1 and 2 are a side view in section and a side of a view of a pressure vessel in the form of an air chamber or Helmholtz resonator according to a first exemplary embodiment, respectively;

FIGS. 3, 4 and 5 are side views in section of individual production steps relating to a diagram accumulator as a subset of a pressure vessel according to a second exemplary embodiment of the invention;

DETAILED DESCRIPTION OF THE INVENTION

Figure 6:
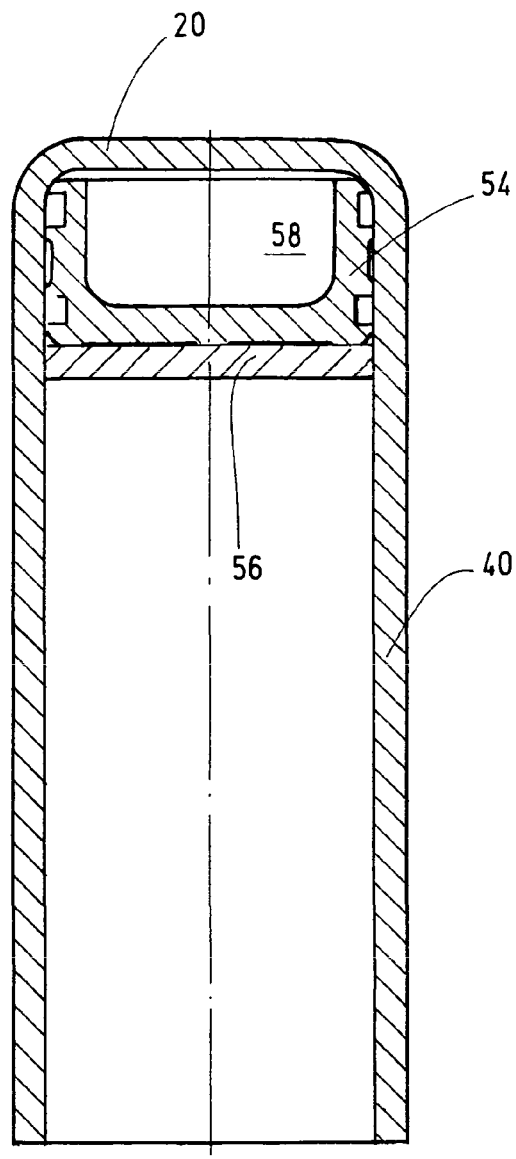
FIGS. 6 and 7 are side views in section of production stages for a piston accumulator as an additional subset of a pressure vessel according to a third exemplary embodiment of the invention.

As 3D printing methods for the production of pressure vessels, as well as the parts thereof, options that are in principle suitable include sinter and powder printing methods, stereolithography and printing with liquid components. All of the above 3D-printing methods are also frequently used in rapid prototyping.

When objects, such as accumulator housings, are to be constructed exclusively from metal, the electron beam melting has proven to be suitable as a 3D printing method. In electron beam melting, metal powder is melted in layers and ablated as a housing wall.

Selective laser melting is also suitable, in which a metal powder is melted in a local manner only. Another possibility is the use of selective laser sintering, in which a metal powder is briefly heated with a laser that melts it. The melt then solidifies with formation of the metallic accumulator housing. All of the above-mentioned 3D printing methods fall into the category of sinter and powder printing methods.

If the pressure vessel is to be printed using plastic materials, printing with liquid plastic materials is an option. In particular multi-jet modeling has proven to be successful, the essential structure of which is very like conventional inkjet printing. In this 3D printing method, liquid plastic material is applied from a nozzle, which can preferably move in several directions. As soon as the material is discharged from the nozzle in a forming manner, it is appropriately hardened under an energy source, for example in the form of UV light.

With the multi-jet modeling, plastic materials in droplet form with dimensions of a few picoliters are discharged, with the spraying of the droplets taking place preferably in a computer-controlled manner with a high clock frequency for example of 2 kHz. Liquefied acrylates have proven to be particularly suitable plastic materials, the viscosity of which can be adjusted to a desired extent by addition of a reactive thinner. By the addition of a photoinitiator, the hardenability with UV radiation is preferably promoted. In an example of a housing material, the plastic material contains as acrylate material 90% Ebecryl 4835, a prepolymer produced by the company UCB, 8% HDDA (company UCB) as reactive thinner for viscosity adjustment and 2% Darocur 1173, produced by the company Ciba-Geigy, as photoinitiator.

In another example, as housing material acrylate materials, 90% Ebecryl 4835 and 4% Ebecryl 230 by the company UCB are envisaged. As reactive thinners it contains 4% HDDA by the company UCB and as photoinitiator 2% Darocur 1173 by the company Ciba-Geigy.

With the above specified plastic materials or other suitable plastic materials, accumulator housings can be constructed using the 3D printing method, as presented for example for a pressure vessel 12 in the form of an air chamber or Helmholtz resonator for pulsation damping of fluids according to the depictions in FIGS. 1 and 2. Integrally attached to the accumulator housing 10 at the bottom end is a fluid connection point 14 with special connection geometry for the purpose of connection of the pressure vessel 12 in a conventional manner to a fluid supply circuit, in particular a gas supply circuit. The accumulator housing 10 essentially forms a spherical cross section, into which the fluid connection point 14 enters via a central channel 16 in a media-conducting manner. The accumulator housing 10 has an essentially constant wall diameter, but it is provided in the center with a corresponding annular reinforcement 18 in the equatorial region. Such pressure vessels 12 can also be printed using a metal powder and are then entirely pressure resistant up to 350 bar in this embodiment, with regular operating or working temperatures of 40° C. to 150° C.

Viewed in the direction of FIGS. 1 and 2, the 3D printing material construction begins either from the bottom end, in other words, beginning at the free end of the fluid connection point 14 or at the top closure side 20 of the pressure vessel 12. With only one 3D printing production device, that pressure vessel 12 can be produced in all sizes, also with changed cross section shapes (oval, polygonal etc.) and different connection points (not depicted). With the same production device, the other accumulator geometries can then also be printed according to the depictions of FIGS. 3-8. In addition, the pressure vessel 12 depicted in FIGS. 1 and 2 can, in particular when it is printed from plastic materials, be provided with additional reinforcement even for applications in the high-pressure range. For example, a support laminate could be applied to its outside, which is not depicted in detail, or the outside of the printed pressure vessel 12 could be provided with surrounding bands, for example made of carbon materials.

In the following exemplary embodiments, the same components as specified above are provided with the same reference numerals. The exemplary embodiment depicted in FIGS. 3 to 5 relates to individual production steps for production of a membrane accumulator 22, as is depicted in FIG. 5 in a longitudinal section depiction. Firstly, according to FIG. 3 in a first working step or production step the bottom housing part 24 is produced using the 3D printing method. This housing part 24 is formed as a shell and once again has on its bottom side a fluid connection point 14 with a media-conducting channel 16. Facing in the direction of the channel 16 at the bottom end of the fluid connection point 14, a thread 26 is subsequently introduced into connection point 14 at the inner circumference thereof by machining. This thread 26 in turn serves to connect the accumulator housing 10 with the bottom housing part 24 to a fluid circuit, in particular a hydraulic circuit, which is not depicted in detail. In the top region of the bottom housing part 24, a circumferential annular groove 28 is introduced, which serves for subsequent introduction of a separating element 30 in the form of a shell-shaped separating membrane 32.

The production of the bottom housing part 24 in the 3D printing method takes place by an application nozzle 34, which with a high clock frequency, for example 2 kHz, discharges the plastic material in the picoliter range for the purpose of production of the bottom housing part 24. Viewed in FIG. 3, for the completion of the multi-jet modeling device, two UV lamps 36 are provided, which appropriately harden the sprayed on plastic material. The machine unit having the application nozzle 34 and UV lamps 36 can be freely moved in all three spatial axes by an adjustment device that is not depicted in detail. In the present depicted case, the printing method is commenced with layered application with the fluid connection point 14 and ends as depicted at the top edge 38 of the bottom housing part 24.

As FIG. 4 then shows, the separating membrane 32 is introduced with a fastening ring 39 in the bottom housing part 24. An edge reinforcement 41 of the separating membrane 32 provided at its top edge engages in a fixing manner in the annular groove 28 of the bottom housing part 24. As FIGS. 4 and 5 additionally show, a valve disk 43 is introduced at the bottom end of the separating membrane 32. Valve disk 43 can close the fluid channel or media channel 16 in the direction of the accumulator housing interior. To this extent, the separating membrane 32 is formed elastically flexible. This design structure is common in such membrane accumulators 22 and has proven to be successful. The fastening ring 39 is formed spring-elastic flexible and presses with its open profile form or cross section form the edge reinforcement 41 in the direction of the annular groove or receiving groove 28 in the accumulator housing 10.

Producing the separating membrane 32, for example from a media-resistant material, such as polytetrafluoroethylene, likewise is conceivable for using the 3D printing method, in order to then in turn fix it with the fastening ring 39, which may also be produced using the 3D printing method, in the bottom housing part 24. In a further embodiment, it is also conceivable to form in a direct manner in the 3D printing method the separating membrane 32 directly on the bottom housing part 24 but without a fastening ring 39. The entire accumulator in the form of the membrane accumulator 22 could then be produced with only one production machine in the 3D printing method. With such a precisely functioning 3D printing method, there is also the possibility to generate the thread 26 on the fluid connection point 14 by the printing method itself. Another suitable material for producing a separating element, such as for example a separating membrane 32, is thermoplastic polyurethane (TPU), which can be worked or formed using a 3D printing method.

If the intermediate production step according to FIG. 4 is achieved, the membrane accumulator 22 is then completed by the 3D printing method, in that the top housing part 40 is then printed following the bottom housing part 24. At the top closure side 20 of the accumulator housing 10, a passage point 42 is then subsequently introduced mechanically or is released in the printing method, which is closed with a plug 44, which can likewise be printed. In this way it is possible to introduce on the gas side 46 of the accumulator 22 an energy store, for example in the form of a working gas such as nitrogen gas, and to store it there. The separating element 30 in the form of the separating membrane 32 then separates this gas side 46 from the fluid side, in particular the hydraulic side 48, of the accumulator 22.

Either the bottom housing part 24 or the top housing part 40 may be produced in a conventional manner, for example by a casting method and to construct only the respective other housing part 40 or 24 using the 3D printing method from plastic or metal materials. The housing parts 24 and 40 can, even when they are produced using the 3D printing method, be produced separately and can then be connected to one another for example at a separating point 50 extending along the top edge 38 by a welding connection or adhesive connection. The accumulator construction can then be adapted across a broad range to practical conditions even in situ.

Figure 7:
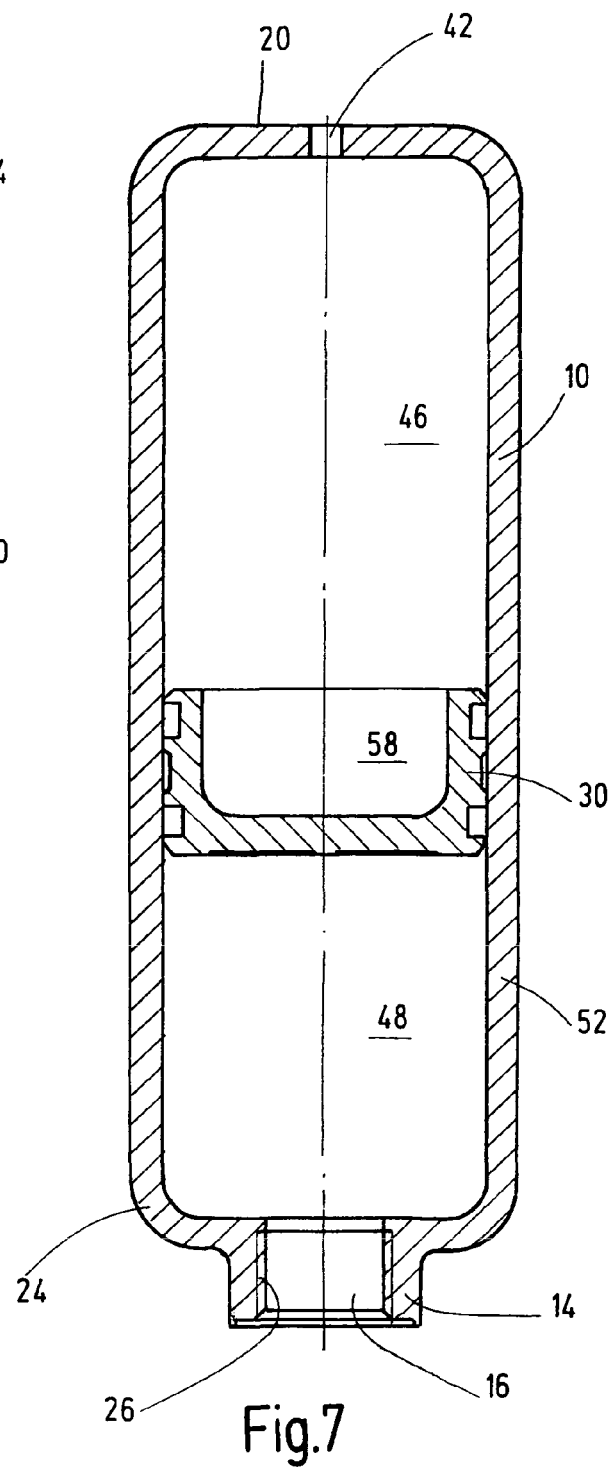

FIGS. 6 and 7 show the formation of a piston accumulator 52 using the 3D printing method. Firstly, in a first production step according to FIG. 6, the top housing part 40 is printed, for example by the already described 3D printing method. The top housing part 40 is formed closed at its top closure side and has essentially the same wall thickness. The separating element 30, this time in the form of a separating piston 54, is then introduced into the top housing part 40. The conventional sealing and guiding systems for the separating piston 54 are omitted for the sake of simplicity. The separating piston 54 can likewise be produced in a 3D printing method. The accumulator housing 10 can then be printed from a metal material and the separating piston 54 from a plastic material for weight reasons.

According to the depiction of FIG. 6, beneath the separating piston 54, by a plate-shaped closure part 56, the free access to the separating piston 54 can then be sealed in a hermetically sealing manner. In this usage state of the closure part 56, an inner wall processing for the top housing part 40 is possible. In this way, impurities in the 3D printing can be eliminated mechanically (machining), thermally or chemically, without contaminant particles also affecting the sealing and guiding systems of the separating piston 54 that are not depicted in detail. The running surface of the separating piston 54 can also be mechanically reworked before the introduction into the accumulator housing 10 or the housing part 40.

Because the closure part 56 in its position in the top housing part 40 according to FIG. 6 can only be moved aside with difficulty, firstly the accumulator housing 10 can also be finished printed, i.e., the bottom housing part 24 with the fluid connection point 14 together with the channel 16 and thread 26 is subsequently produced by 3D printing and then connects in an integral manner to the housing wall structure of the top housing part 40. Because the plug-shaped closure part 56 would then impair the movement of the separating piston 54, the closure part 56 in the closed accumulator housing 10 according to FIG. 7 is thermally or chemically destroyed. The remains of the closure part 56 can be carried off via the fluid connection point 14 from the fluid side of the piston accumulator 52 towards the outside, before the piston accumulator 52 is in turn connected for a viable use to a hydraulic network or the like. In order to increase the volume on the gas side 46 of the piston accumulator 52, the separating piston 54 has a recess 58. Furthermore, for the introduction of the working gas on the gas side 46, the accumulator housing 10 is in turn equipped on the top closure side 20 with a passage point 42 in the form of a bore.

Figure 8:
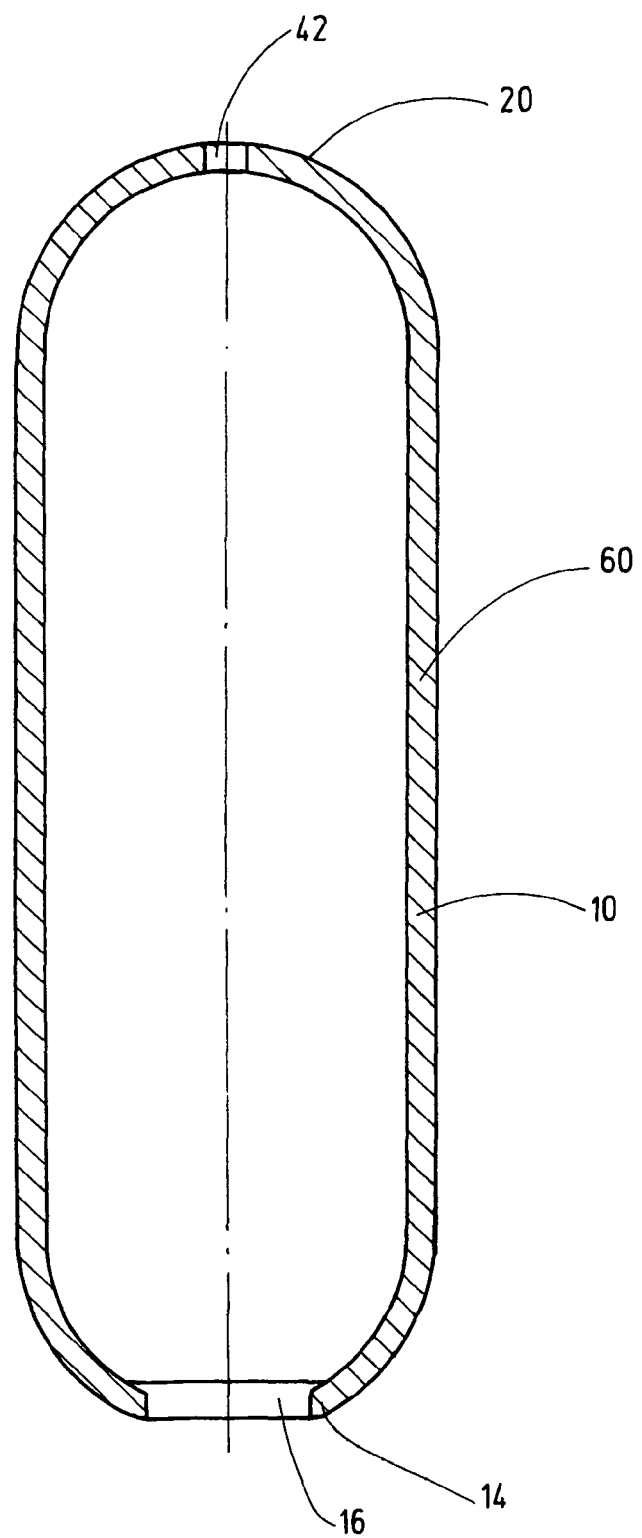
FIG. 8 is a side view in section of an accumulator housing of an additional pressure vessel in the form of a bladder accumulator according to a fourth exemplary embodiment of the invention.

In the last embodiment of a pressure vessel 12, FIG. 8 depicts the accumulator housing 10 of a bladder accumulator 60, with the accumulator housing 10 here again being produced as a whole in the 3D printing method. The accumulator housing 10 has at its bottom end a fluid connection point 14 with a channel cross section 16 of large enough dimensions for the possibility of subsequently inserting into the then created vessel a membrane or accumulator bladder, which is not depicted in detail, as a separating element 30. Here too, variants are conceivable in which the accumulator bladder, which is not depicted in detail, is an integral and non-exchangeable element of the overall bladder accumulator. At the top closure side 20 of the accumulator housing, a passage point 42 is again arranged, by which the gas side of the accumulator bladder can be appropriately filled.

The accumulator housing 10 according to the depiction of FIG. 8 can also be a liner, which can be wrapped in a fiber fabric (not depicted) as a complimentary and reinforcing measure. Producing as a separating element (30) for a bellows accumulator, which is not depicted in detail, a bellows membrane using 3D printing, which can also be produced from metal.

While various embodiments have been chosen to illustrate the invention, it will be understood by those skilled in the art that various changes and modifications can be made therein without departing from the scope of the invention as defined in the claims.

The invention claimed is:

1. A method for producing pressure vessels, the method comprising the steps of:
    producing a first housing part with a first internal chamber by 3D printing;
    introducing a separating element in the first housing part after the producing of the first housing part;
    producing a second housing part with a second internal chamber on the first housing part after the introducing of the separating element such that the separating element separates the first and second internal chambers from one another preventing fluid communication therebetween and such that the first and second housing parts form an overall housing of a pressure vessel;
    attaching a closure part to an inner wall of the first housing part to retain the separating element at a location in the first housing part spaced from an end of the first housing part to which the second housing is coupled to the first housing part; and
    removing the closure part from the first housing part and the second housing part after coupling of the first and second housing parts, thereby forming an accumulator.

2. A method according to claim 1 wherein the second housing part is produced by 3D printing directly on the first housing part.

3. A method according to claim 1 wherein the separating element is formed by 3D printing.

4. A method according to claim 3 wherein the separating element is a piston.

5. A method according to claim 1 wherein the first and second housing parts have first and second inner wall surfaces, respectively, that are mechanically, thermally or chemically retreated.

6. A method according to claim 1 wherein the 3D printing uses at least one of metal or plastic materials.

7. A method according to claim 1 wherein the closure part is destroyed in the first housing part for removal from the first and second housing parts.

8. A method according to claim 7 wherein the closure part is thermally or chemically destroyed.

9. A method according to claim 1 wherein the separating element is sealed in the first housing part by the closure part preventing exposure of the separating element to any reworking of an interior of the first and second housing parts before removal of the closure part.

10. A method according to claim 1 wherein the separating element is formed of a material different from the material of the first and second housing parts.

\* \* \* \* \*